United States Patent
Schaefer et al.

(10) Patent No.: US 7,791,228 B2
(45) Date of Patent: Sep. 7, 2010

(54) ENERGY SUPPLY OF A MEASURING DEVICE

(75) Inventors: Klaus Schaefer, Rheinfelden (DE); Joerg Trinler, Maulburg (DE); Alexander Koprian, Hasel (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 894 days.

(21) Appl. No.: 10/555,010

(22) PCT Filed: Apr. 29, 2004

(86) PCT No.: PCT/EP2004/004579

§ 371 (c)(1), (2), (4) Date: Jan. 3, 2007

(87) PCT Pub. No.: WO2004/098014

PCT Pub. Date: Nov. 11, 2004

(65) Prior Publication Data

US 2007/0090963 A1  Apr. 26, 2007

(30) Foreign Application Priority Data

Apr. 30, 2003  (DE) ................................. 103 19 793

(51) Int. Cl.
*H02H 9/00* (2006.01)
(52) U.S. Cl. ..................... 307/326; 361/93.9; 257/683
(58) Field of Classification Search .................. 307/43, 307/326; 361/56, 57, 93.9, 8, 90; 257/683
See application file for complete search history.

(56) References Cited

U.S. PATENT DOCUMENTS

| | | | | |
|---|---|---|---|---|
| 3,797,311 A | * | 3/1974 | Blanchard et al. | 73/304 C |
| 3,968,407 A | * | 7/1976 | Wilson | 361/55 |
| 4,831,484 A | * | 5/1989 | Bruch | 361/101 |
| 5,045,963 A | * | 9/1991 | Hansen et al. | 361/87 |
| 5,710,552 A | | 1/1998 | McCoy et al. | |
| 6,397,322 B1 | | 5/2002 | Voss | |

FOREIGN PATENT DOCUMENTS

| | | |
|---|---|---|
| DE | 2 429 319 | 2/1975 |
| DE | 2 909 965 | 9/1980 |
| DE | 6 9807465 T | 1/2003 |
| DE | 10 136753 | 2/2003 |
| EP | 565 217 B1 | 1/1993 |
| GB | 1 502 056 | 2/1978 |
| GB | 2 005 932 | 4/1979 |

OTHER PUBLICATIONS

P.C. M. Verhoosel, "Batterie-Wachter", Jul./Aug. 1986.

* cited by examiner

*Primary Examiner*—Albert W Paladini
(74) *Attorney, Agent, or Firm*—Bacon & Thomas, PLLC

(57) ABSTRACT

An energy supply unit for a measuring device for determining and/or monitoring a physical or chemical, process variable of a medium. Included is at least one voltage limiting unit and/or at least one current limiting unit in the energy supply unit, wherein the voltage limiting unit is embodied in such a manner that arising voltages remain under a value, which leads to an explosion in an explosion-endangered area, and wherein the current limiting unit is embodied in such a manner that arising currents and/or heatings associated therewith remain under a value, which leads to an explosion in an explosion-endangered area.

8 Claims, 3 Drawing Sheets

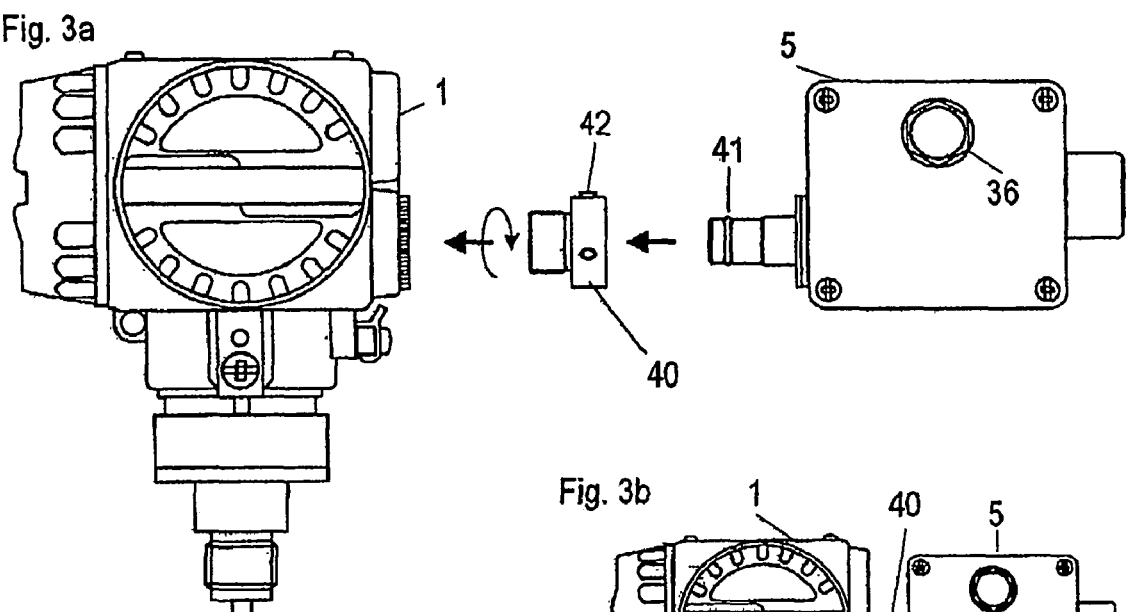
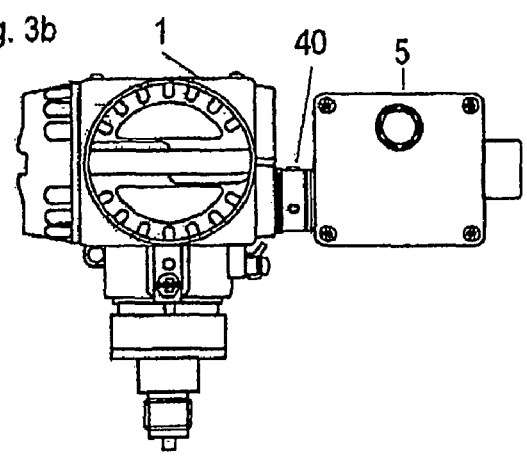

ENERGY SUPPLY OF A MEASURING DEVICE

FIELD OF THE INVENTION

The invention relates to an energy, or power, supply unit for a measuring device for determining and/or monitoring a physical or chemical process variable of a medium. Examples of process variables are fill level, viscosity, pressure, density or also the pH-value of a medium. The measuring devices are, in turn, correspondingly equipped to measure the variable of interest. Endress+Hauser manufactures and sells e.g. pressure measuring devices, under the mark Cerabar.

BACKGROUND OF THE INVENTION

Measuring devices require an energy supply for the measuring, evaluation and, in appropriate cases, also display of the measured values. It is, however, not always possible to provide a suitable current connection e.g. via cable. A typical problem arises e.g. when fill levels of liquids need to be measured in mobile units. In such cases, it makes sense to use e.g. batteries or fuel cells. However, if measurements are done in explosion-endangered zones or areas, then special attention to safety is required. For instance, a short circuit might lead to voltages which are too high, and high currents might lead to excessive heating. A further problem is usually that energy units such as batteries or fuel cells are not permitted to be replaced in explosion-endangered areas, because, most often, the process of replacement cancels the protection against explosion or makes it no longer secure.

SUMMARY OF THE INVENTION

An object of the invention is to provide a measuring device energy supply that can be used in explosion-endangered areas.

The object is achieved according to the invention through combination of the following features: That at least one voltage limiting unit and/or at least one current limiting unit is provided in the energy supply unit, with the voltage limiting unit being embodied such that occurring voltages remain below a value that leads to an explosion in an explosion-endangered area; and/or with the current limiting unit being embodied such that occurring currents and/or heatings associated therewith remain under a value that leads to an explosion in an explosion-endangered area. The exact limit values depend, in such case, on the character of the explosion-endangered zone itself and on the conditions existing there. A concept here is, thus, that the energy supply unit is embodied such that the voltage and/or the current are/is limited, so that neither the voltage nor the heating associated with the current can lead to an explosion. This makes it possible to use the energy supply unit also in explosion-endangered areas, e.g. in the case of hydrogen-containing tanks.

An advantageous embodiment includes that at least one energy source is provided in the energy supply unit. Thus, it should not involve e.g. a normal current supply via current conductors, but, instead, should be a system which is as self-sufficient and independent as possible, in order e.g. to support mobility.

An embodiment associated therewith provides that the energy source is at least one battery and/or at least one fuel cell.

An embodiment includes that the energy supply unit includes at least one capsule unit, in which the energy source is located. A further development includes that this capsule unit is protected against tampering in a manner such that it can only be opened by the manufacturer and that the energy sources can only be replaced by the manufacturer. An implementation provides that the capsule unit and/or the energy source is destroyed in the case of unauthorized opening. This has the advantage that safety requirements can not be violated by unauthorized (e.g. untrained, or inadvertent) use and that, therefore, possibly highly dangerous situations can be avoided. Thus, it is assured that the part dangerous for explosions, thus the energy source, is only accessible by the manufacturer. On the basis of the capsule unit, the energy source becomes completely a replacement part.

An advantageous embodiment provides that at least one voltage limiting unit and/or at least one current limiting unit is provided in the capsule unit. In this way, it is possible for the energy source to be replaced even in explosion-endangered areas, since no too high voltages and too high currents or heatings then occur. This is a great advantage, since usually the replacement of a battery means removal of the measuring device from the endangered area or e.g. the emptying of a tank.

An advantageous embodiment includes that the voltage limiting unit is at least one drop-resistance. This is a very simple and cost-effective implementation, by way of which an output voltage is reduced in a manner such that no voltage arises, which could lead to an explosion. The size of the resistance depends, in such case, also on the dimensioning of the energy source.

An advantageous embodiment includes that the current limiting unit is a plurality of drop resistances. In this way, the current, and the associated heating, is spread over a plurality of separate resistances. In this way, a possible explosion because of the heating is likewise prevented. Moreover, these drop resistances represent a very simple and cost-effective solution. Of course, the drop resistances used for the voltage limiting and current limiting can be suitably combined. Also in this case, the dimensioning of resistances depends on the energy source and also on the characteristics of the explosion-endangered area.

An advantageous embodiment provides that at least one switch-on unit is provided, which activates the energy supply to the measuring device by the energy supply unit. If the energy source is one with limited energy content, then it makes sense to arrange that the measuring device not measure continuously, but, instead, must be switched on. The advantage lies in the increased life of the energy source, because it is not being used continuously. An embodiment provides that also a switch-off unit is provided, wherein this function can be provided by a toggling of the switch-on unit.

An advantageous embodiment provides that at least one time-limiting unit is provided, which turns the energy supply to the measuring device by the energy supply unit off following an adjustable period of time. This is especially advantageous, because it can happen that the switching-off of the energy supply will be forgotten. The period of time is either determined at the factory or it is adjustable via an appropriate input unit. In this way, also larger time periods can e.g. be specified, when e.g. the filling of a tank is to be observed. Another idea for lowering energy consumption and thus increasing life is to perform a suitable calibration. Thus, most measuring devices transmit their measured values with a 4 . . . 20 mA signal. The absolute current level is of lesser relevance, so that e.g. the upper limit can be reduced, in order to reduce current consumption. This can be accomplished by way of an appropriate calibration.

An advantageous embodiment includes that at least one checking unit is provided, which reviews the energy source with respect to its energy content. Connected therewith is a corresponding display, which shows whether the energy content is still sufficient or whether it has fallen beneath a certain value. It is also possible to distinguish e.g. between energy and no energy. A threshold value would, however, permit arranging for replacement of the energy source early enough.

An advantageous embodiment provides that the energy supply unit is a modular unit. This permits connecting the energy supply unit with any measuring device for operating such. This can be very cost-favorable. Furthermore, the wide area of application and mobility is also supported by the fact that the operating and attachment is possible in explosion-endangered areas, so that a connecting and the measurement are possible there. For the modular construction, there is then also a connecting unit with sealing devices, which enable a releasable connection. One implementation provides further that the energy supply unit is adaptable using an adapting unit, so that the attachment and use are made easier.

BRIEF DESCRIPTION OF THE DRAWINGS

The invention will now be explained in greater detail on the basis of the drawings, the figures of which show as follows:

FIGS. 3a and 3b an illustration of the connecting of the energy supply unit with a measuring device.

DESCRIPTION OF THE PREFERRED EMBODIMENTS

Figure 1:
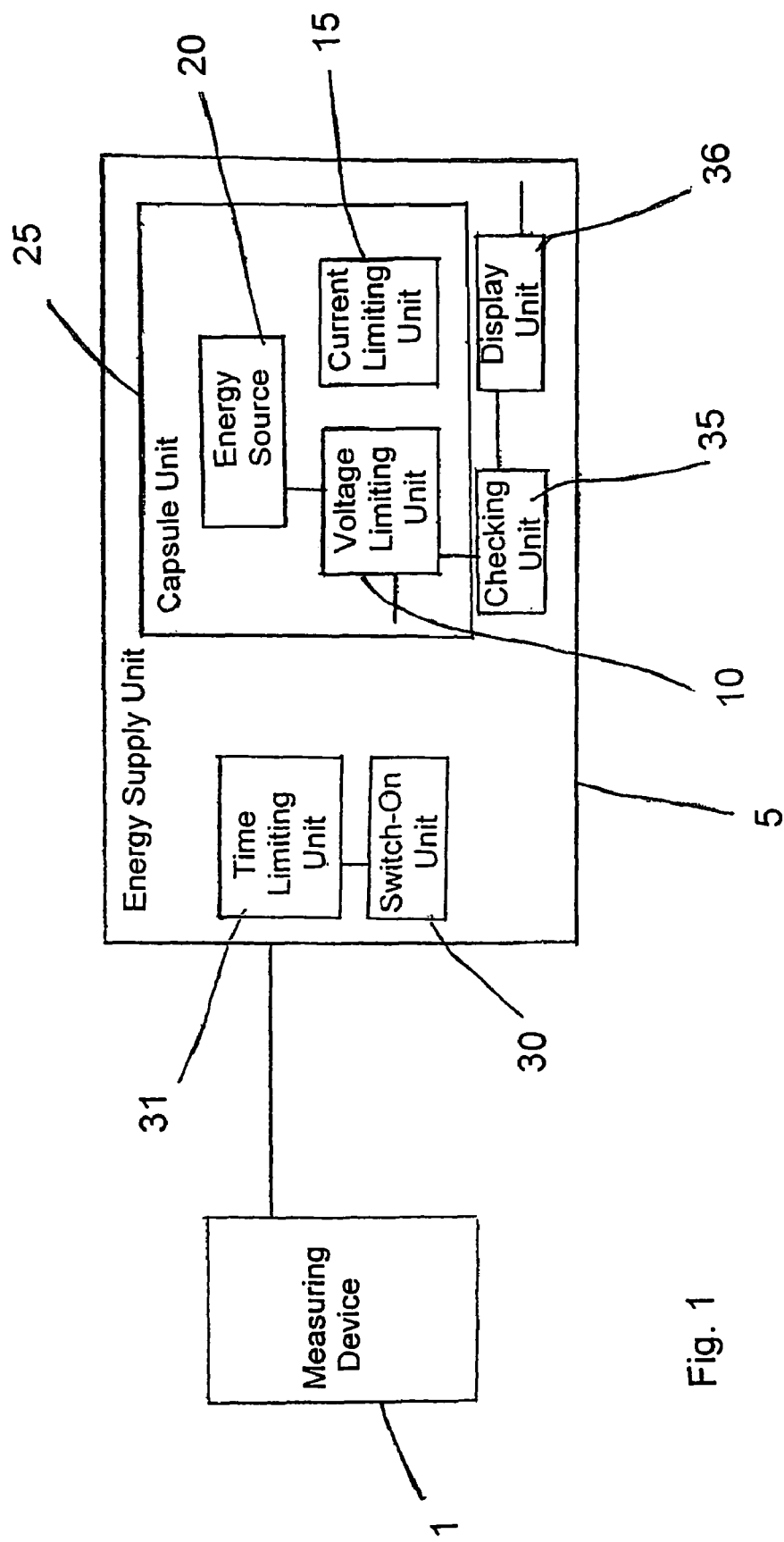
FIG. 1 a block diagram of the measuring device and the energy supply unit.

FIG. 1 shows a block diagram of the measuring device 1 and the energy supply unit 5. The medium to be measured with the measuring device 1 is not shown. Also not shown is that the application, here, is in an explosion endangered area. Present in the energy supply unit 5 is the capsule unit 25. The capsule unit 25 contains the actual energy source 20. In front of source 20 are located a voltage limiting unit 10 and a current limiting unit 15. Both provide the advantage that they enable operation in an explosion-endangered area, and, above all, replacement of the energy source 20, respectively the capsule unit 25, in such an area. The capsule unit 25 is e.g. embodied as a replacement part in such a manner that tampering with it leads to its destruction. Thus, always only the entire capsule unit 25, with energy source 20 and the two limiting units 10, 15, is replaced. This assures, on the one hand, that even during replacement, no explosion can happen, because of the limiting units 10, 15. On the other hand, no changes can be undertaken on the energy source 20 that would compromise the protection. The energy source 20, respectively the capsule unit 25, is connected with a checking unit 35. The checking unit is constructed such that it delivers via a display unit 36 information concerning the energy content of the energy source 20. This has the advantage that preparations can be made early enough for the replacement of the capsule unit 25. Furthermore, a switch-on unit 30 is provided, in which e.g. a pushbutton switch is used to make connection between the energy supply unit 5 and the measuring device 1, in order that the energy supply unit 5 can supply the measuring device with energy. Connected therewith is, here, a time limiting unit 31, which interrupts the energy supply after a certain time, so that the life of the energy source 20 is increased by providing energy only in the case of need. A standard value for the time span can be about 30 seconds for pure checking tasks. This time span depends, however, also on the particular application.

Figure 2:
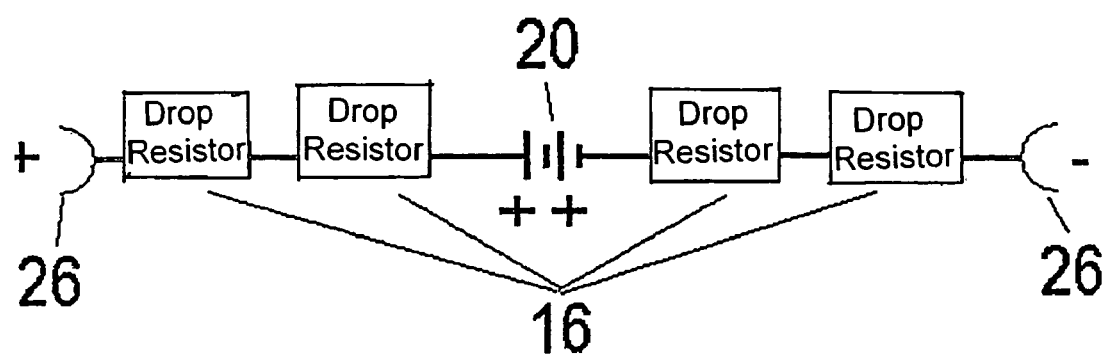
FIG. 2 an equivalent circuit for the energy source with current-limiting and voltage-limiting.

FIG. 2 shows the circuit of the energy source 20, which is, here, two batteries, with, in this example, four drop resistors 16, which function as current, and voltage, limiting units 10, 15. Such a unit is located in the capsule unit 25. Also provided are two sockets 26, which allow tapping of the energy from the capsule unit 25.

FIGS. 3a and 3b provide an illustration of the connecting of the energy supply unit 5 with the measuring device 1. The measuring device is, for example, a Cerabar process-pressure measuring device, as manufactured and sold by the assignee. The two are connected via an adapter unit 40, which is secured e.g. with threaded screws 42. Also e.g. the orienting of the energy supply unit 5 is possible via this adapter unit 40. Provided on the end of the energy supply unit 5 is an O-ring, which seals the connection against fouling, moisture, etc. The display unit 36 is, for example, a glass window, behind which are located two LEDs, which glow, for example, red and green, for signaling the energy condition of the energy source 20. The arrows in FIG. 3a show the direction in which the energy supply unit 5 is connected with the measuring device 1. The adapter unit can be rotated and so enables the orienting of the energy supply unit 5. Illustrated on the adapter unit are the threaded screws 42, which enable a securing of the adapter unit. FIG. 3b shows the result of the connecting.

The invention claimed is:

1. An energy supply unit for a measuring device for determining and/or monitoring a physical or chemical, process variable of a medium, comprising:
    at least one energy source provided in the energy supply unit;
    at least one capsule unit provided in the energy supply unit;
    at least one voltage limiting unit; and/or
    at least one current limiting unit, wherein:
    said at least one energy source and said at least one voltage limiting unit and/or said at least one current limiting unit being located in said at least one capsule unit
    said at least one voltage limiting unit is embodied in such a manner that arising voltages remain below a value that leads to an explosion in an explosion-endangered area, and/or
    said at least one current limiting unit is embodied in such a manner that arising currents and/or heatings associated therewith remain below a value that leads to an explosion in an explosion-endangered area.

2. The energy supply unit as claimed in claim 1, wherein:
    said energy source is at least one battery and/or at least one fuel cell.

3. The energy supply unit as claimed in claim 1, wherein:
    said at least one voltage limiting unit is at least one drop resistance.

4. The energy supply unit as claimed in claim 1, wherein:
    said at least one current limiting unit is a plurality of drop resistances.

5. The energy supply unit as claimed in claim 1, further comprising:
    at least one switch-on unit, which activates the energy supplying of the energy measuring device by said at least one energy supply unit.

6. The energy supply unit as claimed in claim 1, further comprising:
    at least one time limiting unit, which turns off the energy supply of the energy measuring device by said at least one energy supply unit after an adjustable time span.

7. The energy supply unit as claimed in claim 1, further comprising:
    at least one checking unit, which checks said at least one energy source regarding its energy content.

8. The energy supply unit as claimed in claim 1, wherein:
    said at least one energy supply unit is a modular unit.

* * * * *